US010490074B2

(12) United States Patent
Jiang et al.

(10) Patent No.: US 10,490,074 B2
(45) Date of Patent: Nov. 26, 2019

(54) FREQUENCY BIASING FOR DOPPLER SHIFT COMPENSATION IN WIRELESS COMMUNICATIONS SYSTEMS

(71) Applicant: QUALCOMM Incorporated, San Diego, CA (US)

(72) Inventors: Libin Jiang, Bridgewater, NJ (US); Shailesh Patil, Raritan, NJ (US); Peter Gaal, San Diego, CA (US); Durga Prasad Malladi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 301 days.

(21) Appl. No.: 15/590,769

(22) Filed: May 9, 2017

(65) Prior Publication Data

US 2018/0330611 A1 Nov. 15, 2018

(51) Int. Cl.
*G08G 1/09* (2006.01)
*G08G 1/0967* (2006.01)
(Continued)

(52) U.S. Cl.
CPC ..... *G08G 1/096791* (2013.01); *G08G 1/0125* (2013.01); *G08G 1/163* (2013.01);
(Continued)

(58) Field of Classification Search
CPC .......... G08G 1/096791; G08G 1/0125; G08G 1/163; G08G 1/22; H04W 36/32; H04W 56/0035; B60W 2050/048
(Continued)

(56) References Cited

U.S. PATENT DOCUMENTS

| 5,596,330 A * | 1/1997 | Yokev ..................... G01S 1/026 342/387 |
| 2005/0114023 A1* | 5/2005 | Williamson ......... G01C 21/165 701/472 |

(Continued)

FOREIGN PATENT DOCUMENTS

| EP | 1119115 A1 | 7/2001 |
| EP | 2346176 A1 | 7/2011 |

(Continued)

OTHER PUBLICATIONS

JP-2017011611-A English machine translation (Year: 2017).*
International Search Report and Written Opinion—PCT/US2018/026760—ISA/EPO—dated Jun. 29, 2018.

*Primary Examiner* — Anne M Antonucci
*Assistant Examiner* — James E Stroud
(74) *Attorney, Agent, or Firm* — Arent Fox LLP

(57) ABSTRACT

Various aspects related to frequency biasing to compensate for frequency variations caused by Doppler shift in V2V communication systems are described. In an aspect of the disclosure, a method, a computer-readable medium, and an apparatus are provided. The apparatus, e.g., a UE, may be configured to determine a velocity of the apparatus, and determine a frequency biasing adjustment based on the determined velocity of the apparatus. The apparatus may be further configured to communicate with UE based on an adjusted carrier frequency determined based on a carrier frequency and the determined frequency biasing adjustment. In some configurations, a driving environment of the apparatus maybe considered, and the frequency biasing adjustment is determined further based on the determined driving environment.

30 Claims, 9 Drawing Sheets

(51) Int. Cl.
*H04W 36/32* (2009.01)
*G08G 1/00* (2006.01)
*G08G 1/16* (2006.01)
*G08G 1/01* (2006.01)
*H04W 56/00* (2009.01)
*B60W 50/04* (2006.01)

(52) U.S. Cl.
CPC .............. *G08G 1/22* (2013.01); *H04W 36/32* (2013.01); *H04W 56/0035* (2013.01); *B60W 2050/048* (2013.01)

(58) Field of Classification Search
USPC ......................................................... 701/119
See application file for complete search history.

(56) References Cited

U.S. PATENT DOCUMENTS

| | | | | |
|---|---|---|---|---|
| 2006/0074558 A1* | 4/2006 | Williamson | ......... | G01C 21/165 |
| | | | | 701/469 |
| 2009/0219202 A1* | 9/2009 | Pon | ................ | G01S 19/24 |
| | | | | 342/357.25 |
| 2011/0238307 A1* | 9/2011 | Psiaki | .................... | G01C 21/28 |
| | | | | 701/469 |
| 2016/0036519 A1* | 2/2016 | Loomis | ................... | H04B 7/22 |
| | | | | 370/316 |

FOREIGN PATENT DOCUMENTS

| | | | | |
|---|---|---|---|---|
| JP | 2017011611 A | * | 1/2017 | ........ H04W 56/0035 |
| JP | 2017011611 A | | 1/2017 | |

* cited by examiner

FREQUENCY BIASING FOR DOPPLER SHIFT COMPENSATION IN WIRELESS COMMUNICATIONS SYSTEMS

BACKGROUND

Field

The present disclosure relates generally to communication systems, and more particularly, to a methods and apparatus for frequency biasing in vehicle-to-vehicle (V2V) communications systems to compensate for frequency variations caused by Doppler shift.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

V2V communications systems are networks in which vehicles and/or mobile units on roads may communicate to provide each other with information, such as safety warnings, mobility and/or traffic information. In V2V communication systems, Doppler shift due to high speed of vehicles is a considerable factor that degrades the communication performance. Accordingly, there is a need for methods and techniques to mitigate the effects of Doppler shift that degrade V2V communication performance and allow proper transmission and/or reception between vehicles.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In V2V communication systems, Doppler frequency shift (or simply Doppler shift) due to high speed of devices is a considerable factor that degrades the communication performance, e.g., packet reception performance. For example if two vehicles move towards each other with a speed of 250 km/hour then the relative speed is 500 km/hr. At 6 GHz carrier frequency, the Doppler shift of a received signal (e.g., received by one moving vehicle from the other) is 2.78 kHz. Large Doppler shifts degrade the channel estimation accuracy and may have a significant impact on the packet error rate and thus in degrading the performance and reliability of V2V communications between devices. Since one of the primary purpose of V2V communications is to promote safety among V2V devices (vehicles), e.g., by communicating safety related messages, addressing the problems caused by the Doppler shift becomes even more important.

Various aspects related to frequency biasing to compensate for frequency variations caused by Doppler shift in V2V type communications are described. Some such frequency variations caused due to Doppler frequency shift may be observed, for example, between two transmitting and receiving devices that are in motion and may be traveling at high speeds.

In certain aspects, a frequency biasing adjustment to compensate for the Doppler shift may be determined at each user equipment (UE), e.g., vehicle, in a V2V communication system, based on the vehicle speed. The determined frequency biasing adjustment may be applied at the transmitter and/or receiver of the UE to adjust the carrier frequency for transmission and reception of V2V messages, e.g., V2V safety messages.

For a given pair of UEs in V2V communication, e.g., a transmitting UE (a vehicle) and a receiving UE (another vehicle), the Doppler shift may be higher at the receiving UE when the two vehicles move in opposite directions (e.g., with high relative speed). This may include a first scenario where two vehicles move towards each other, and a second scenario where the two vehicles move away from each other. However, from a safety perspective, the first scenario is more important since there is a potential of collision between the vehicle moving towards each other. In the case when two vehicles move in the same direction, the Doppler shift may be usually lower in comparison to the case where the vehicles move in the opposite direction towards each other. While the frequency variation due to the Doppler shift in the case of vehicles moving in the same direction may be low, correctly receiving V2V messages from vehicles traveling in the same direction is also important for safety. For example, in a divided road, most accidents/collisions may occur between vehicles moving in the same direction.

In an aspect of the disclosure, a method, a computer-readable medium, and an apparatus are provided. The apparatus, e.g., a UE, may be configured to determine a velocity of the apparatus, and determine a frequency biasing adjustment based on the determined velocity of the apparatus. The apparatus may be further configured to communicate with UE based on an adjusted carrier frequency that is adjusted based on a carrier frequency and the determined frequency biasing adjustment.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
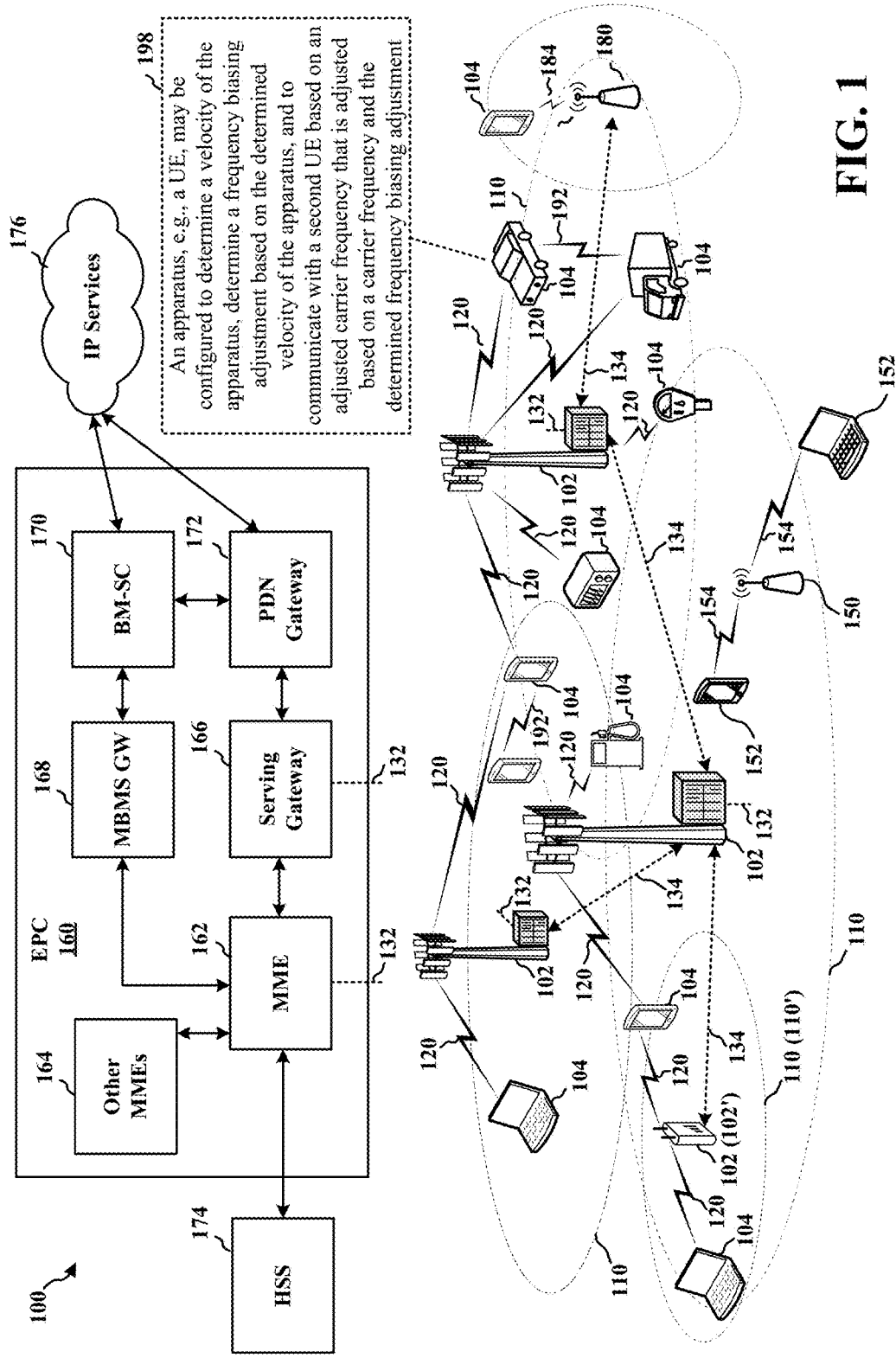
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, an apparatus of the system 100, e.g., UE 104, may be configured to determine a velocity of the apparatus, determine a frequency biasing adjustment based on the determined velocity of the apparatus, and communicate with a second UE based on an adjusted carrier frequency that is adjusted based on a carrier frequency and the determined frequency biasing adjustment (198).

Figure 2:
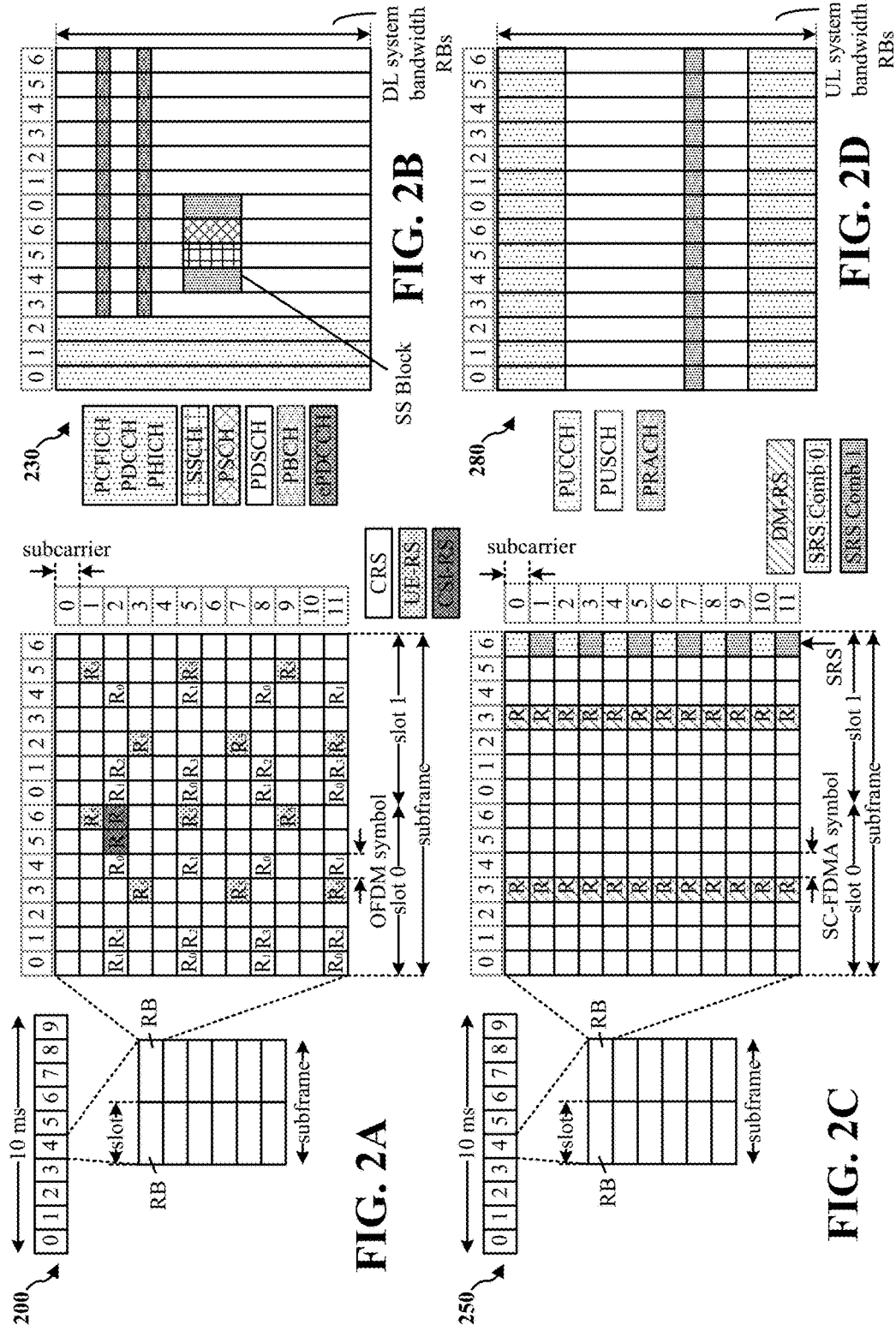
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
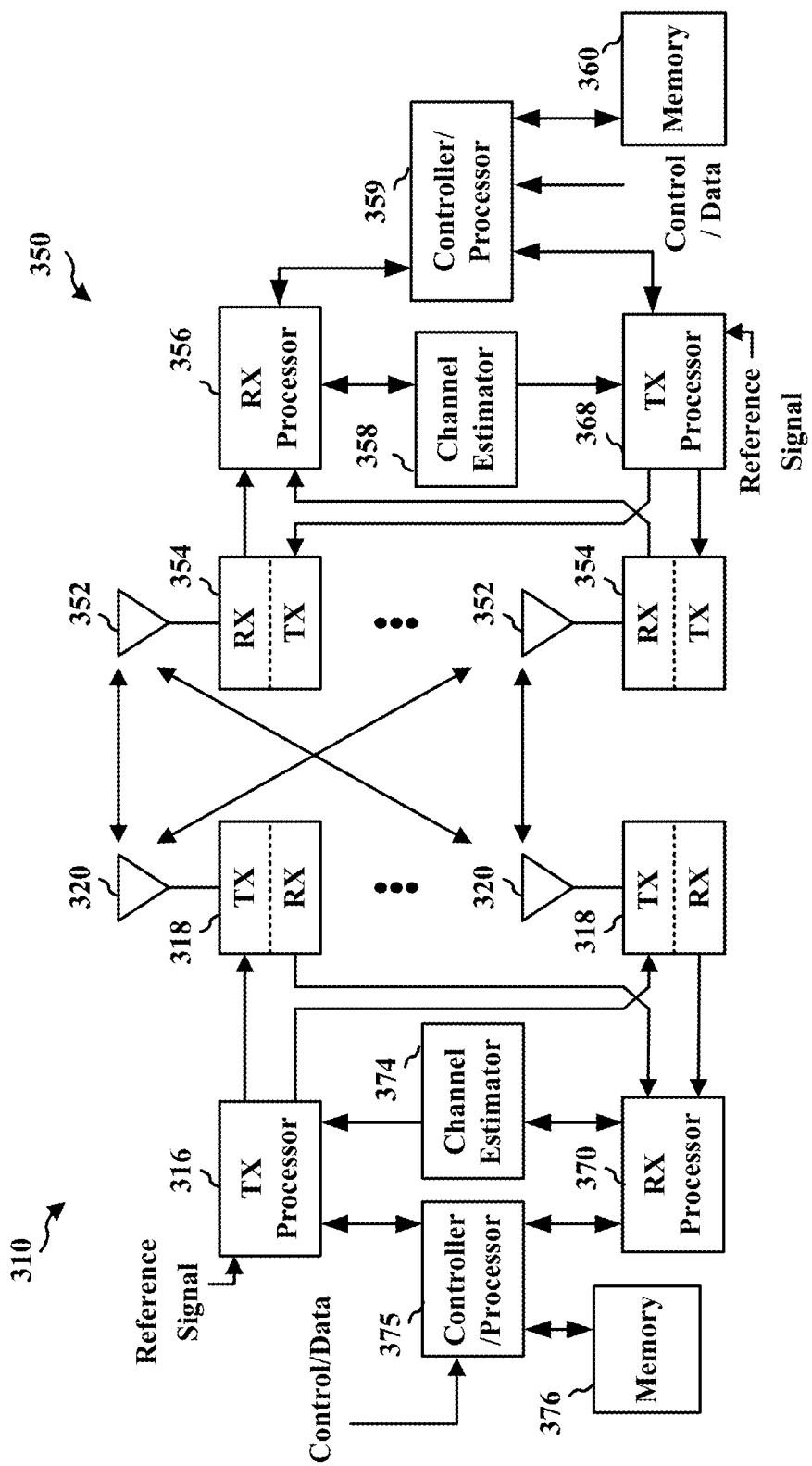
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
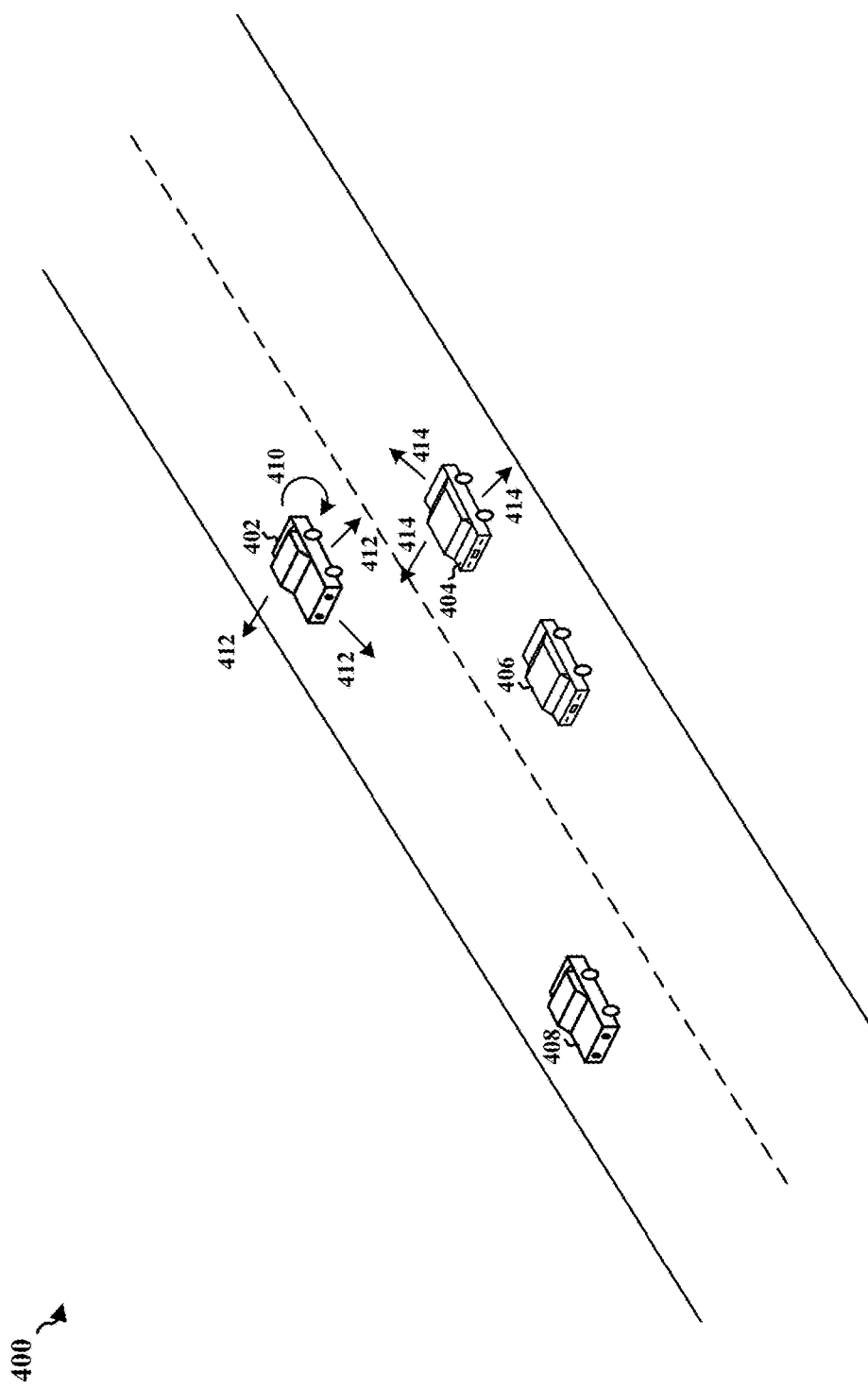
FIG. 4 illustrates an example of V2V communications between the UEs where a Doppler shift may cause errors in the V2V communications.

FIG. 4 is a drawing 400 illustrating an example of V2V communications between the UEs where a Doppler shift may cause errors in the V2V communications. In the illustrated example, a plurality of UEs (e.g., vehicles) including UEs 402, 404, 406, and 408 are shown. As can be seen, some UEs may be traveling in the opposite direction relative to each other, e.g., such as UEs 402 and 404, while others may be moving in the same direction relative to each other, e.g., such as UEs 402 and 408 or UEs 404 and 406. In the illustrated example, UE 402 may be transmitting (e.g., broadcasting) a V2V message 412 and may be monitoring for V2V messages from other UEs, while the UE 404 may be transmitting a V2V message 414 and may be monitoring for V2V messages from other UEs. While not explicitly shown, the other UEs may also be transmitting V2V messages and monitoring for V2V messages. In such a scenario, frequency variations caused due to the Doppler frequency shift may be observed, for example, between the UEs that are in motion and may be traveling at high speeds. For example, at UE 402 the reception of V2V message 414 from UE 404 may be affected due to frequency variation caused by the Doppler shift. Similarly, at UE 404 the reception of V2V message 412 from UE 402 may be affected due to the Doppler shift. A received signal on a direct path between UEs 402 and 404 (assuming no signal reflection paths) has a positive Doppler shift, that is, the received frequency is higher than the case when the two vehicles (UEs 402, 404) are stationary. Similarly, V2V communication of other UEs may also be affected by the Doppler shift. Thus, it may be desirable to compensate for the frequency variations caused by the positive Doppler shift to allow accurate V2V communication and minimize the probability of collision between the UEs.

In accordance with an aspect, one or more UEs may be configured to compensate, at least partially, for the frequency variations caused by the Doppler shift using at least one of a receiver biasing or a transmitter biasing. For example, in accordance with an aspect, the UE 402 may monitor to receive V2V messages, e.g., message 414, and may determine and apply a receiver biasing adjustment to a carrier frequency based on a current speed/velocity of the UE 402. In accordance with one aspect, in order to determine a frequency biasing adjustment ($f_{ba}$) for V2V communication (e.g., receiving/transmitting V2V messages), the UE 402 may determine (curved arrow 410) a current speed of the UE 402 (e.g., V). The UE 402 may then determine (410) the frequency biasing adjustment ($f_{ba}$) based on the determined speed and a carrier frequency (fc). In an aspect, the UE 402 may determine the frequency biasing adjustment $f_{ba}$ based on $f_{ba}=-[V*f_c/c]$, where "V" is the current speed of UE 402, $f_c$ is the carrier frequency and c is the speed of light. In some configurations, the UE 402 may also determine and apply a transmitter biasing adjustment (e.g., for transmission of V2V message 412) based on the current speed of the UE 402 and the carrier frequency (fc). Following the determination of frequency biasing adjustment $f_{ba}$, the UE 402 may communicate with other UEs, e.g., UE 404, based on an adjusted carrier frequency ($f_{ca}$) that is adjusted based on the carrier frequency $f_c$ and the determined frequency biasing adjustment $f_{ba}$. In some configurations, the adjusted carrier frequency $f_{ca}$ is determined based on $f_c+f_{ba}$.

In a similar manner, other UEs 404, 406, 408 may perform receiver and/or transmitter biasing adjustments based on their respective speeds and the carrier frequency. For example, for communicating with other UEs, the UE 404 may determine its velocity and determine a frequency biasing adjustment based on the determined velocity of the UE 404 in the same manner as discussed with respect to UE 402.

In one configuration, the frequency biasing adjustment may be tuned based on an environment of the UE. Such a configuration is discussed infra with respect to FIGS. 5, 6.

Figure 5:
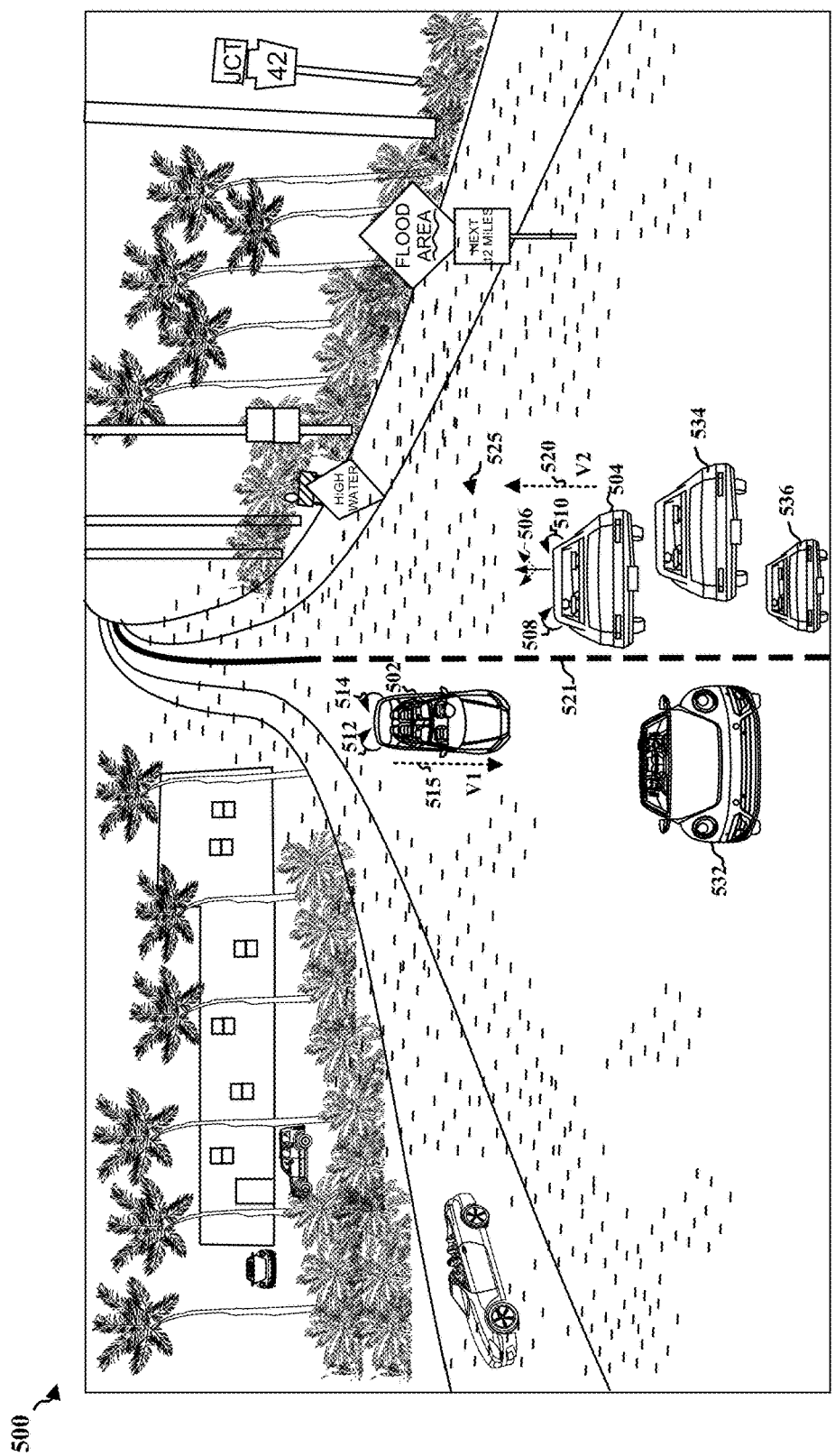
FIG. 5 illustrates a portion of a V2V communication system in an example where UEs are on an undivided road and a Doppler shift may cause errors in V2V communications between the UEs.

FIG. 5 is a drawing illustrating a portion of a V2V communication system 500 in an example where UEs are on an undivided road and a Doppler shift may cause errors in V2V communications between the UEs. The driving environment shown in FIG. 5 may be observed, for example, on undivided roads, undivided highways/freeways, and/or other roads without a physical divider (barrier) between the opposite direction traffic. In such an environment, the UEs (vehicles) may be moving in the same as well as opposite directions relative to each other. While there may be vehicles moving in the same direction, in the case of an undivided road, there is also potential for a collision for the vehicles moving in the opposite direction towards each other. The portion of the exemplary V2V system 500 shown in FIG. 5 includes a first UE 502 and a second UE 504 moving in the opposite direction towards each other, and may further include UEs 532, 534, and 536 as shown. In such a case, a received signal on a direct path between UEs 502 and 504 (assuming no signal reflection paths) has a positive Doppler shift, that is, the received frequency is higher than the case when the two vehicles are stationary or are moving away from each other. Since the effect of Doppler shift is higher when the vehicles move in the opposite direction towards each, more degradation is caused in V2V communication between UEs traveling in the opposite direction towards each other, in such cases it may be desirable to compensate for the frequency variations caused by the positive Doppler shift in UEs traveling in the opposite direction towards each other to allow for more accurate V2V communication and to minimize the probability of collision between the UEs.

In the illustrated example, the first UE 502 may be moving with a speed/velocity $V_1$ in a first direction (indicated by arrow 515) while the second UE 504 may be moving with a speed/velocity $V_2$ in a second direction (indicated by arrow 520) which is opposite the first direction. In this example, the second UE 504 is illustrated to be transmitting (e.g., broadcasting) a V2V message 506. In the case of a broadcast, the message may be heard by one or more other UEs, which may be monitoring the frequency band/resources allocated for V2V messages. Consider for the purposes of discussion that the first UE 502 is monitoring for V2V messages from other vehicles in the system 500. It may be further considered that the first and second UEs 502, 504 are moving at relative speeds high enough to cause a significant Doppler shift that in turn causes variations in the receive/transmit carrier frequency (fc).

In accordance with an aspect, since the UEs 502, 504 know their respective speeds ($V_1/V_2$), the individual UEs may be configured to compensate, at least partially, for the frequency variations caused by the Doppler shift using at least one of receiver biasing or transmitter biasing. For example, in accordance with an aspect, the first UE 502 that is monitoring to receive V2V messages, e.g., message 506, may determine and apply a receiver biasing adjustment to a carrier frequency based on a current speed of the UE 502 to correctly receive the V2V message. In a similar manner, the transmitting UE 504 may pre-bias the transmitter, e.g., by adjusting the carrier frequency prior for transmission of message 506, based on a current speed of the UE 504. In some configurations, in order to determine a frequency biasing adjustment ($f_{ba}$) for V2V communication (e.g., receiving/transmitting V2V messages), the UE 504/502 may be configured to determine (curved arrow 508/512) a current speed/velocity of the UE 504/502 (e.g., $V_1/V_2$). The UE 504/502 may then determine (510/514) the frequency biasing adjustment ($f_{ba}$) based on the determined speed and a carrier frequency (fc). In such configurations, the frequency biasing adjustment ($f_{ba}$) may be determined (510/514) by the UE 504/502 in accordance with the equation (1) below:

$$f_{ba}=-[V*f_c/c]. \quad (1)$$

In the above equation (1), V is the current speed of the given UE (e.g., UE 504/502) determining the biasing adjustment (e.g., $V_1$ or $V_2$ depending on the UE performing the frequency biasing adjustment), and c is the speed of light. Thus, if $f1_{ba}$ is a frequency biasing adjustment for the receiving UE 502 and $f2_{ba}$ is a frequency biasing adjustment for the transmitting UE 504, then in accordance with equation (1), $f1_{ba}=-[V_1*f_c/C]$ and $f2_{ba}=-[V_2*f_c/C]$. Subsequently, the carrier frequency may be adjusted based on the determined frequency biasing adjustment at one or both the UEs. For example, an adjusted carrier frequency ($f_{ca}$) for use in communicating the V2V messages may be determined based on $f_c+f_{ba}$, e.g., $f_{ca}=f_c+f_{ba}$.

While performing the carrier frequency adjustment in the above discussed manner may improve V2V communications for vehicles traveling in the opposite directions, the same may not be true for V2V communications between vehicles traveling in the same direction. In fact, in some cases if the same frequency biasing adjustment is used for V2V communications between vehicles traveling in the same direction, the V2V communication performance for two vehicles traveling in the same direction may degrade. Thus it should be appreciated that the driving environment of the UE (e.g., vehicles traveling on a divided or undivided road and/or other factors) may be considered while determining the appropriate frequency biasing adjustment to be used in the given driving environment. Accordingly, in certain aspects, the driving environment of the UE may be considered when calculating the frequency biasing adjustment $f_{ba}$. In some configurations, determining a driving environment of a given UE may include determining one or more of a variety of factors such as whether the given UE that intends to apply the frequency adjustment is traveling on a divided road or an undivided road, a congestion of traffic headed in a same direction of the UE, a congestion of traffic headed in an opposite direction of the UE, a Global Positioning System (GPS) position of the UE, a map of an area associated with the GPS position of the UE, road conditions in an area associated with the GPS position of the UE, weather conditions in an area associated with the GPS position of the UE, whether the UE is traveling on a road with an opposing traffic passing lane (in the US, a solid line adjacent a driving lane may indicate that the UE may not enter an opposing traffic lane and dotted line adjacent a driving lane may indicate that the UE may enter an opposing traffic lane), or accident/collision history of an area associated with the GPS position of the UE, etc. In some configurations, the driving environment for a given UE (performing a frequency biasing adjustment) may be determined based on a GPS location/position of the UE and a map associated with the area corresponding to the GPS position of the UE. The GPS location/position may be determined, e.g., using a GPS receiver of the UE. In some configurations, input from a variety of sources may be used in determining the driving environment of the UE. For example, such sources may include one or more sensors and/or a variety of different applications (apps) that can provide such inputs, such as, a map/navigation app, a weather forecast app, a traffic forecast app, an area accident report app and the like. Such apps may be installed on the UE and obtain information from one or more network based servers, satellites or other standalone devices.

In some configurations, when the driving environment of the UE is considered, the frequency biasing adjustment $f_{ba}$ may be determined (510/514) by the UE 504/502 using the following equation (2) that is similar to equation (1) but includes an additional tunable parameter that takes into consideration the effect of the driving environment. In such configurations, the UE 504/502 may be configured to determine the frequency biasing adjustment $f_{ba}$ as follows:

$$f_{ba} = -a*[V*f_c/c]. \quad (2)$$

In the above equation (2), "a" is a tunable parameter whose value depends on the determined driving environment and other notations are the same as used in equation (1). In various configurations, the tunable parameter "a" is between 0 and 1, e.g., $0 \leq a \leq 1$. Each UE performing the frequency biasing adjustment may determine its driving environment. Depending on the driving environment, e.g., divided or undivided road, the UE 504/502 making the frequency adjustment may decide whether it is more important/desirable to accurately communicate with vehicles traveling in the same direction or those traveling in the opposite direction, and tune the parameter "a" accordingly. For example, in a driving environment such as illustrated in FIG. 5, e.g., an undivided road, there may be a greater likelihood of collision between vehicles moving in the opposite direction towards each other than when the driving environment has a divided road. Thus in such a case, the V2V communication between UEs moving in the opposite direction may be more important than the V2V communication between UEs moving in the same direction. Accordingly, minimizing Doppler shift caused error in V2V communication (reception/transmission of V2V messages) between UEs moving in the opposite direction may be more important than minimizing Doppler shift caused error in V2V communication between UEs moving in the same direction. In such cases, to favor the V2V communication performance between vehicles traveling in the opposite direction towards each other, in accordance with one aspect, a higher value of "a" may be chosen. Thus, to compensate for the Doppler shift of the direct path (between UEs 502, 504) the receiving UE 502 may determine (514) the frequency biasing adjustment $f_{ba}$ based on equation (2) by tuning "a" to a high value, e.g., a value closer to the higher limit of "a" which is 1. For instance, in one particular example, in the undivided road driving environment illustrated in FIG. 5, the UE 502 may determine the frequency biasing adjustment $f1_{ba}$ by choosing a=1 in equation (2), e.g., $f1_{ba}=-[V_1*f_c/C]$. In such an example, equation (2) effectively reduces to equation (1). The carrier frequency adjustment at UE 502 ($f1_{ca}$) may be determined as $f1_{ca}=fc+f1_{ba}$. In a similar manner, in some configurations, the transmitting UE 504 may determine (510) a transmitter biasing for transmitting the V2V message 506 to partially compensate for the Doppler shift from the perspective of the UE 504. The frequency biasing adjustment at the transmitter UE 504 may be calculated based on the speed of UE 504 (e.g., $V_2$), the carrier frequency ($f_c$) and with "a"=1, e.g., $f2_{ba}=-[V_2*f_c/C]$. The carrier frequency adjustment at UE 504 ($f2_{ca}$) may be determined as $f2_{ca}=fc+f2_{ba}$. While tuning the parameter "a" to the higher value, e.g., 1, favors the V2V communication performance for UEs traveling in the opposite direction and allows for the UEs to compensate for the errors that may be caused by the Doppler shift, in some cases the higher value of "a" may degrade V2V communication performance for UEs traveling in the same direction. However, as discussed above, given the driving environment where it is more important, from a safety perspective, to be able to more accurately communicate with UEs traveling towards each other in the opposite direction, performance degradation for V2V communication between the UEs heading in the same direction may be acceptable to some level.

While one or both the UEs 502, 504 may apply frequency biasing, in the cases where both the transmitting and receiving UEs (e.g., UEs 504 and 502) apply the frequency biasing at the respective ends, then the Doppler shift of the direct path may be completely compensated. However, the same may not be true for reflected paths. While in the above discussed example, for simplification and to facilitate an understanding, the value of the tunable parameter "a" is chosen based on the fact that UE 504/502 is on an undivided road (e.g., driving environment includes an undivided road), it should be appreciated that the determining of the driving environment may take into consideration a number of additional factors that may affect to what value the tunable parameter is tuned, e.g., a value selected for the tunable parameter "a". Such factors may include, for example, a congestion level of traffic headed in a same direction as the UE, a congestion of traffic headed in an opposite direction of the UE, current road conditions in the area associated with the GPS position of the UE, weather conditions in the area associated with the GPS position of the UE, whether the UE is traveling on a road with an opposing traffic passing lane, or history of collisions in the area associated with the GPS position of the UE, etc. For example, in addition to determining that the UE 502/504 is on an undivided road, as part of determining the driving environment, the UE 502/504 may consider the traffic congestion in the area (e.g., based on inputs from a traffic/navigation app) in the same as well as the opposite direction. If the traffic congestion is determined to be greater in the opposite direction (e.g., more traffic congestion in the opposite direction from the perspective of the UE 502/504 determining the congestion level), then such a condition may raise the likelihood that vehicles heading in the opposite directions may attempt passing, e.g., by using the lane of oncoming traffic to overtake the vehicle(s) traveling in the same direction. For example, consider UE 502 and let the traffic congestion in the same direction as UE 502 be X, and congestion level in the opposite direction be Y. In some configurations, a probability Ps(X,Y) of same direction collision and a probability Po(X,Y) of opposite direction collision may be calculated. The calculation of Ps(X,Y) and Po(X,Y) may take into account whether passing is allowed in an opposing traffic lane on the undivided road or section of the undivided road. If X is low, Y is high, and passing is allowed (e.g., broken line 521 indicates passing is allowed), then there may be more passing attempts by vehicles in the opposite direction, which increases the probability of a head-on collision. If passing is not allowed in an opposing traffic lane, the probability Po(X,Y) of an opposite-direction collision may be lower than when passing is allowed in an opposing traffic lane, but may be still higher than the probability Ps(X,Y) of a same direction collision due to the fact there are more vehicles traveling in the opposite direction in this particular case (e.g., more vehicles on the side of UE 504). In such a case, again it may be more important to choose a high value (e.g., closer to a=1) of the tunable parameter "a" to favor V2V communication performance between vehicles traveling in the opposite directions towards each other. Thus, if Po(X,Y)>Ps(X,Y), a higher value of "a" may be used. However, if the traffic congestion is determined to be greater in the same direction than in the opposite direction, then such a condition may raise the probability that vehicles traveling in the same direction may collide into each other, e.g., causing rear end collision/accidents. In such a case, it may be decided that favoring V2V communication performance between vehicles traveling in the same direction may be more desirable. Since the road is undivided, it may still remain important to have reliable communication between vehicles traveling in the opposite direction, and accordingly a low value (e.g., lower than 1 which would have been otherwise selected in an undivided road case) of the tunable parameter "a" may be more effective. Thus, in such a scenario the parameter "a" may be tuned to a value, e.g., close to a mid-value between 0 and 1 (e.g., 0.4 or 0.5), that may help improve V2V communication performance between vehicles traveling in both directions even though such a value may not completely compensate for the Doppler shift in either direction.

Similarly, as part of determining the driving environment, the UE 502/504 may consider the current road conditions (e.g., based on input from a traffic/navigation app and/or based on input from one or more cameras/sensors). The current road condition may include updates regarding construction/repair projects on the road in the proximity of the UE 502/504. Based on such construction/repair updates, the UE 502/504 may attempt to determine how the other UEs may behave in order to determine whether there is an increased potential for collisions (e.g., whether UEs heading in the same direction or opposite direction may try to overtake other UEs to avoid the construction/repair work). In some configurations, the UE 502/504 may calculate a probability of same direction collision and a probability of opposite direction collision taking into consideration the road conditions. Again, the calculation of the probability may also take into consideration whether passing in an opposing traffic lane is allowed on the road (e.g., across the broken line 521 against oncoming traffic). For example, in the undivided road case illustrated in FIG. 5, there may be more passing attempts by vehicles on the side of construction on to the other side which increases the probability of a head-on collision. In this case if passing is allowed, the probability of opposite-direction collision may be higher and thus a higher value of "a" may be chosen. Thus, based on the determined probabilities, the UE 502/504 may decide if favoring V2V communication performance between vehicles in the same direction is more important than favoring V2V communication performance between vehicles traveling towards each other in the opposite direction, and tune the parameter "a" according to the decision. A history of collisions/accidents on the road travelled by the UE 502/504 may allow the UE 502/504 to make a judgement whether collisions between the vehicles heading in the opposite direction are more likely than collisions between the vehicles heading in the same direction. For example, if a collision history report indicates that historically (e.g., in the past days/weeks/months/year) there have been more collisions between the vehicles heading in the opposite direction than vehicles heading in the same direction, such indication may result in the UE 502/504 choosing a higher value of "a" to favor V2V communication performance between vehicles heading in the opposite direction over a V2V communication performance between vehicles heading in the same direction.

In a similar manner, in some configurations, the weather condition information in the area corresponding to the GPS position of the UE 502/504, alone or in combination with the traffic/road condition information, may allow the UE 502/504 to decide whether, under the given set of conditions, the V2V communication between the vehicles heading in the opposite direction are more important than the V2V communication between the vehicles heading in the same direction. The weather conditions in the area may indicate an impact of inclement weather on the road traveled by UE 502/504, e.g., such as high level of water and/or flooding on the road. In some configurations, the UE 502/504 may calculate a probability of same direction collision and a probability of opposite direction collision taking into consideration the weather conditions. For example, as illustrated in FIG. 5, the UE 502/504 may determine (e.g., based on received weather condition updates via one or more installed weather/navigation applications) that the undivided road is flooded in one or more regions such as region 525 where heavy flooding has occurred. In such a case, the vehicles may likely attempt to avoid the flooded region 525 by passing over the broken line 521 when possible. Thus the calculation of the probability may also take into consideration whether passing is allowed in an opposing traffic lane on the section of the undivided road. If passing is allowed in an opposing traffic lane (e.g., as indicated by the broken line 521 in the section of the road around the flooded region 525), there may be more passing attempts by vehicles in the opposite direction, which increases the probability of head-on collision. Since the probability of opposite direction collisions may be higher than the probability of same direction collisions in such cases, it may be preferable to favor V2V communication between opposite direction traffic over V2V communication between same direction traffic. Accordingly, in such cases a higher value of "a" may be used. If passing is not allowed in an opposing traffic lane, the probability of opposite-direction collisions may be lower than the probability of same-direction collisions. However, the fact that the road is undivided, it may still remain important to have reliable communication between vehicles traveling in the opposite direction. Thus, in such a scenario the parameter "a" may be tuned in a balanced way (e.g., close to a mid-value between 0 and 1 rather than choosing a low value), that may help improve V2V communication performance between vehicles traveling in both directions. Based on such an analysis, the UE 502/504 may tune (e.g., select a value for) the parameter "a" appropriately.

Figure 6:
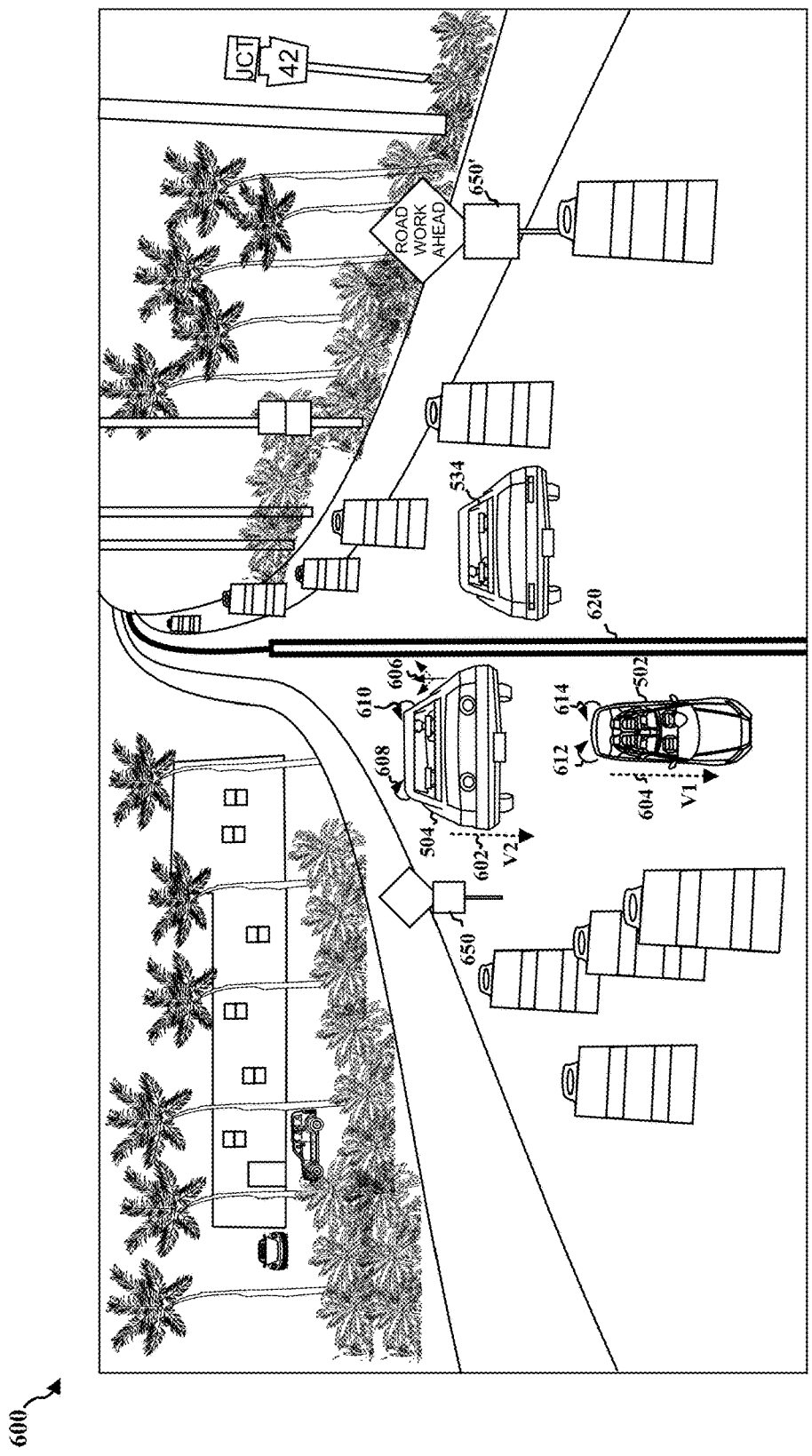
FIG. 6 illustrates another example where the UEs are on a divided road and a Doppler shift may cause errors in V2V communications between the UEs.

FIG. 6 is drawing 600 illustrating another example where the UEs 502, 504 of the communication system 500 are on a divided road and a Doppler shift may cause errors in V2V communications between the UEs. The driving environment shown in the example of FIG. 6 may be observed, for example, on divided roads, divided highways/freeways and/or other roads with a divider (physical barrier) between the opposite direction traffic. In such a driving environment, the UEs (vehicles) on the same side of a divider 620 may be moving in the same direction. Unlike the previous example discussed with respect to FIG. 5 where the road was undivided, in the illustrated example of FIG. 6, UEs 502 and 504 are on the same side of a divider 620 that divides the road between the traffic traveling in opposite directions. In the illustrated example, UEs 502 and 504 are traveling in the same direction as indicated by arrows 602 and 604 which is opposite the direction of UE 534 on the other side of the divider 620. It may be appreciated that in such a driving environment, in general, the potential for a collision/accident may be greater for the UEs 502, 504 moving in the same direction on the same side of a divided road rather than UEs that are moving towards each other in opposite directions since the road is divided. Thus, while the UE 534 may also be transmitting V2V messages, from a safety perspective, in such driving environments the V2V communications between UEs traveling in the same direction may be favored in some configurations over V2V communications between UEs traveling in opposite directions.

In the illustrated example, the first UE 502 may be moving with a speed/velocity $V_1$ while the second UE 504 may be moving with a speed/velocity $V_2$ in the same direction. Similar to the previous example, the second UE 504 may be transmitting (e.g., broadcasting) a V2V message 606 and the first UE 502 may be monitoring for V2V messages from other UEs. While not shown in the example for simplicity, the UE 502 may also transmit, e.g., broadcast, V2V messages. For discussion purposes it may be considered the first and second UEs 502, 504 are moving at relative speeds that causes Doppler shift which in turn causes variations in the receive/transmit carrier frequency (fc). As previous discussed with respect to the example of FIG. 5, the UE 502 may monitor to receive V2V messages, e.g., message 606, and may determine and apply a receiver biasing adjustment to a carrier frequency based on a current speed of the UE 502 while the transmitting UE 504 may pre-bias the transmitter, e.g., by adjusting the carrier frequency prior to transmission of message 606, based on a current speed of the UE 504.

In some configurations, in order to determine a frequency biasing adjustment $f_{ba}$ for V2V communication (e.g., receiving/transmitting V2V messages), the UE 504/502 may be configured to determine (curved arrow 608/612) a current speed/velocity of the UE 504/502 (e.g., $V_1/V_2$). The UE 504/502 may then determine (610/614) the frequency biasing adjustment $f_{ba}$ based on the determined speed V and a carrier frequency fc, e.g., in accordance with equation (2), i.e., $f_{ba}=-a*[V*f_c/C]$. However, as previously discussed with respect to FIG. 5, the amount of frequency biasing adjustment needed to compensate for the Doppler shift may not be uniform in every case and rather depends on the driving environment of the UE determining the adjustment. Particularly, as discussed in detail with respect to FIG. 5 example, the tuning of the tunable parameter "a" may be determined based on the driving environment and may change based on the various factors (e.g., divided/undivided road, congestion level of traffic headed in the same/opposite directions as the UE, current road/weather conditions and/or accident history in an area associated with the GPS position of the UE) considered in determining the driving environment of the UE 504/502.

Depending on the determined driving environment (e.g., divided or undivided road), the UE 504/502 making the frequency adjustment may decide whether it is more important/desirable to favor V2V communication performance between vehicles traveling in the same direction over V2V communication performance between vehicles traveling in the opposite direction, and may tune the parameter "a" accordingly. For example, in a driving environment such as illustrated in FIG. 6, e.g., divided road, a probability of collisions between vehicles traveling in the opposite direction towards each other may be very low (e.g., due to proper division and separation by the divider 620), while there may be a greater likelihood of accidents (e.g., rear ending, sideway collisions, etc.) between vehicles moving in the same direction. In such a driving environment, V2V communication between UEs moving in the same direction may be more important than between UEs moving in the opposite direction. It should be noted that when two vehicles are moving in the same direction, the Doppler shift is usually lower than the Doppler shift observed in cases when the vehicles move in the opposite direction towards each other. Therefore, in such cases, to favor the V2V communication performance between vehicles traveling in the same direction, in accordance with one aspect, a low value of the tunable parameter "a" may be chosen given that the Doppler shift is lower, unlike the previous case discussed with respect to FIG. 5 where choosing a higher value of "a" (e.g., a=1) may be more desirable in general. To compensate for the Doppler shift of the direct path (between UEs 502, 504), in one configuration the UE 504/502 may determine (610/614) the frequency biasing adjustment $f_{ba}$ based on equation (2) and tune "a" to a lower value (e.g., less than 1). In a divided road type driving environment where the focus may be to improve V2V communication performance between vehicles traveling in the same direction, tuning "a" to a higher value (e.g., a=1) may be counterproductive and may degrade the V2V communication performance for such vehicles. For example, if the two UEs 502 and 504 are traveling with the same speed (e.g., $V_1=V_2$) then no frequency biasing adjustment is needed for the direct path. Thus, in such cases, tuning "a" to a lower value is appropriate.

Thus, in the above discussed manner a value of the tunable parameter "a" may be selected based on the determined driving environment. In some configurations, one or both of the UEs 504/502 may individually perform frequency biasing adjustment from their perspective. The transmitting UE 504 may determine (610) frequency biasing adjustment ($f2_{ba}$) based on the speed of UE 504 (e.g., $V_2$), the carrier frequency ($f_c$) in accordance with equation (2), e.g., $f2_{ba}=-a*[V_2*f_c/C]$. The carrier frequency adjustment at UE 504 ($f2_{ca}$) may be determined as $f2_{ca}=fc+f2_{ba}$. In a similar manner, the receiving UE 502 may determine (614) the frequency biasing adjustment $f1_{ba}$ in accordance with equation (2), e.g., $f1_{ba}=-a*[V_1*f_c/C]$. The carrier frequency adjustment at UE 502 ($f1_{ca}$) may be determined as $f1_{ca}=fc+f1_{ba}$. While in the above example, for simplifying the discussion the value of the tunable parameter "a" is discussed as being chosen based on the fact that UE 504/502 is on a divided road, as discussed with respect to FIG. 6 in great detail, the determination of the driving environment may take into consideration a number of additional factors, e.g., traffic congestion level in a same/opposite direction as the UE, current road conditions in the area, weather conditions in the area, collision history, etc., that may affect the selection of an appropriate value of the tunable parameter "a". For example, in addition to determining that the UE 504/502 is on a divided road, as part of determining the driving environment, the UE 504/502 may consider, among other factors, the current road conditions indicating construction/repair projects on the road, in order to select a suitable value of the tunable parameter "a". In some configurations, the UE 504/502 may calculate a probability of same direction collision and a probability of opposite direction collision taking into consideration information regarding the construction zones, repairs and/or other road work. In the case of a divided road such as illustrated in FIG. 6, construction zones (e.g., indicated by construction signs 650/650') may increase the risk of same direction collisions due to rear endings, as cars tend to abruptly slow down and/or attempt to maneuver to avoid construction region. In such a case, the probability of same-direction collision may be higher and thus a lower value of "a" may be chosen.

While tuning the parameter "a" to a low value favors the V2V communication performance for UEs traveling in the same direction, the Doppler shift compensation for V2V communication performance between UEs traveling in the opposite direction may not be sufficient with "a" tuned to low values. However, given the driving environment in this particular example, not having the most optimal communication performance for V2V communication between the UEs heading in the opposite direction may be acceptable.

Figure 7:
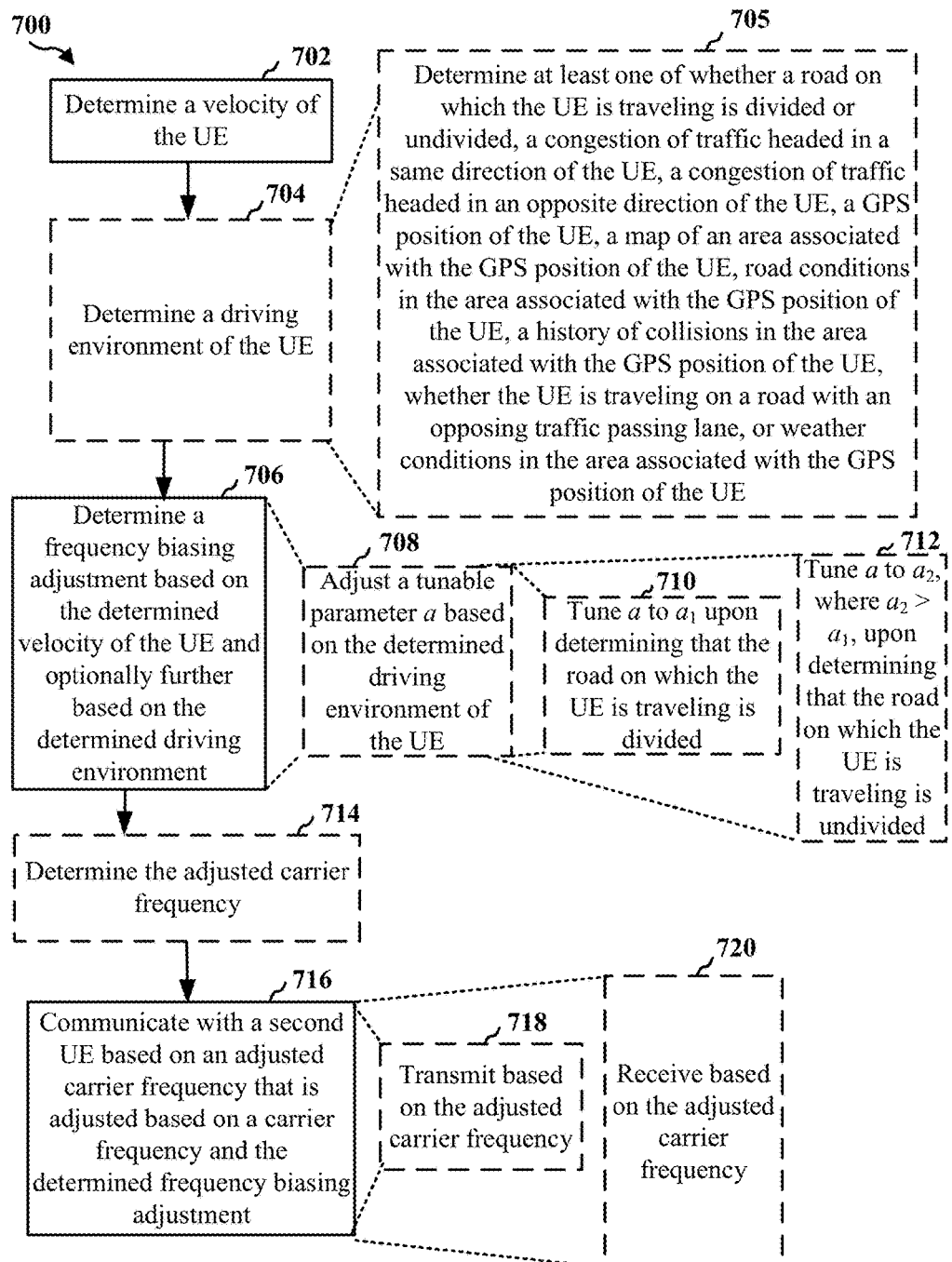
FIG. 7 is a flowchart of a method of wireless communication.

FIG. 7 is a flowchart 700 of a method of wireless communication. The method may be performed by a UE (e.g., the UE 104/502/504, the apparatus 802/802'). At 702, the UE may determine a current speed/velocity of the UE, e.g., the speed with which the UE may be traveling. For example, with reference to FIGS. 5-6, the UE 502/504 may determine the speed with which the UE is moving. The speed may be determined by the UE based on measurements performed by a speed/velocity sensor and/or speedometer within the UE. In some other configurations, the speed/velocity may be determined based on signals received from an external source, e.g., received GPS signals from a GPS source. The current speed/velocity of the UE may be an instantaneous speed or an average speed of the UE.

At 704, the UE may determine a driving environment of the UE. For example, as discussed in detail with respect to FIGS. 5-6, the UE may be driving in a variety of possible environments, e.g., divided road, undivided road, one way road, etc., and may be among other vehicles that may be moving in, e.g., the same direction as the UE and/or moving in both the same and opposite direction as the UE. Since in some configurations, the frequency biasing adjustment may be determined in accordance with equation (2) including the tunable parameter "a" that may depend on the driving environment, in accordance with certain aspects, the UE may be configured to take the driving environment into consideration while calculating frequency biasing adjustments for Doppler shift compensation. Thus in some configurations, the driving environment may be determined prior to or while calculating the frequency biasing adjustments, and the determination may be used in choosing an optimum value for parameter "a" for the determined environment. In some configurations, the driving environment of the UE may be determined based on a GPS location/position of the UE and a map associated with the area corresponding with the GPS position of the UE. In some configurations, input from a variety of sources may be used in determining the driving environment of the UE. For example, such sources may include one or more sensors (e.g., a camera), network based sources (e.g., location servers) and/or one or more different applications on the UE that can obtain the information from one or more servers or satellites over a wireless communication network and provide the input(s) to the UE. For example, one such app may be a map/navigation application that can provide a map/map data of the area corresponding to a determined GPS location/position of the UE. Based on the GPS location/position and the map, the UE may be able to determine the driving environment. For example, the UE may be able to determine if the UE is on a divided road, an undivided road, a one-way road. Furthermore, the UE may be able to determine, predict and/or infer/deduce from the above if the UE is among other UEs (vehicles) traveling in the same direction only (e.g., divided road or one-way road) or among other UEs moving in the same as well as opposite direction (e.g., undivided road).

In some configurations, as part of determining the driving environment of the UE, at 705 the UE may determine at least one of whether a road on which the UE is traveling is divided or undivided, a congestion of traffic headed in a same direction of the UE, a congestion of traffic headed in an opposite direction of the UE, a GPS position of the UE, a map of an area associated with the GPS position of the UE, road conditions in an area associated with the GPS position of the UE, weather conditions in an area associated with the GPS position of the UE, whether the UE is traveling on a road with an opposing traffic passing lane, or a history of collisions in the area associated with the GPS position of the UE. In some configurations, various factors identified above (e.g., road conditions, weather conditions, collision history, etc.) may be determined based on the GPS location/position of the UE, the map of the area associated with the GPS position of the UE and/or based on input from a variety of sources such as sensors and/or a variety of different apps that can obtain and provide such information to the UE.

As discussed above, based on the determined driving environment the UE may decide whether it is more important/desirable to minimize the effect of Doppler shift in V2V communication between UEs traveling in the same direction or those traveling in the opposite direction, and tune the parameter "a" according to the decision. As discussed above in detail with respect to FIG. 5, in addition to determining that the UE is on an undivided road which may have both way traffic, the UE 502/504 may also consider one or more of the above mentioned factors (e.g., traffic congestion in the same/opposite direction, weather condition, road condition, accident report, etc.) to determine whether, from a safety perspective, V2V communication performance between the UEs moving in the opposite direction towards each other or between the UEs moving in the same direction should be favored (and in turn to appropriately tune the parameter "a"). These factors may affect the collision probability of vehicles moving in the same direction or opposite direction, in turn may affect the decision whether the UE should favor V2V communication performance with the UEs moving in the opposite direction towards each other or with the UEs moving in the same direction, and thus may affect choice of the tunable parameter "a". While some examples already discussed with respect to FIGS. 5 and 6 discuss how the one or more of the above listed factors may affect the choice of the tunable parameter "a", some additional examples will be discussed below.

In some configurations, at 706, the UE may determine a frequency biasing adjustment $f_{ba}$ based on the determined velocity of the UE. For example, as discussed with respect to FIG. 5, in some configurations the frequency biasing adjustment $f_{ba}$ may be determined in accordance with equation (1) where the determination is based on the velocity of the UE, the carrier frequency $f_c$, and the speed of light c. However, in some other configurations, the driving environment of the UE may be considered in determining the frequency biasing adjustment $f_{ba}$, where the effect of the driving environment may be reflected by the value selected for the tunable parameter "a" in equation (2). Thus in such configurations, the frequency biasing adjustment $f_{ba}$ may be determined further based on the determined driving environment. In such configurations, the information regarding the driving environment determined at 704 and 705 may be used in determining the frequency biasing adjustment $f_{ba}$.

Thus in some configurations, where the UE driving environment is considered, the frequency biasing adjustment $f_{ba}$ is determined based on $f_{ba}=-a*[V*f_c/C]$. In such configurations, the operation illustrated at block 708 may be performed as part of determining the frequency biasing adjustment $f_{ba}$ at 706. At 708, the tunable parameter "a" may be adjusted based on the determined driving environment of the UE. As discussed above, determination of the driving environment of the UE (determined as described above at 704 and 705) may allow the UE to tune/adjust the parameter "a" in a way that may favor the V2V communication performance between UEs in at least one desired direction, e.g., UEs traveling in opposite directions towards each other or UEs traveling in the same direction. For example, on a divided road there may be a greater probability of collisions between UEs traveling in the same direction and thus it may be considered more important to favor V2V communication performance between UEs traveling in the same direction. Thus in this case, to compensate for the Doppler shift, a frequency biasing that is more appropriate for V2V communication between UEs traveling in the same direction may be applied even if such frequency biasing is not optimal for V2V communication between UEs traveling in the opposite direction. Thus in some configurations, the operation at 708 may include performing the operation at 710 where the parameter "a" is tuned to "a1" upon determining that the road on which the UE is traveling is a divided road. In various configurations, tuning the parameter "a" includes, e.g., adjusting the value of "a" between 0 and 1 based on the determined driving environment. Since the Doppler shift is lower when two vehicles travel in the same direction, tuning "a" to "a1" includes selecting a lower value of "a", e.g., on a lower end between 0 and 1. It should be appreciated that for two vehicles traveling in the same direction with the same speed, no frequency biasing may be needed, and a higher value of a (e.g., 1 or close to 1) may negatively affect the V2V communication between such UEs. Therefore, in the cases where V2V communication between UEs traveling in the same direction is desired, selecting a lower value of "a" is desirable to compensate for the Doppler shift in a balanced way.

In another scenario where the determined environment indicates that the UE is on an undivided road, there may be a greater probability of collisions between UEs traveling in the opposite direction towards each other and thus it may be considered more important to favor V2V communication performance between UEs traveling in the opposite direction towards each other. In such a case, to compensate for the Doppler shift, a frequency biasing that is more appropriate for V2V communication between UEs traveling in the opposite direction towards each other may be applied even if such frequency biasing is not optimal for V2V communication between UEs traveling in the same direction. Thus in some configurations, the operation at 708 may include performing the operation at 712 where the parameter "a" is tuned to "a2" (where a2>a1) upon determining that the road on which the UE is traveling is an undivided road. Since the Doppler shift is higher when two vehicles travel in the opposite direction towards each other, tuning "a" to "a2" includes selecting a higher value of "a" (e.g., 1 or close to 1, which is greater than a1 in the previous case).

In addition to whether the UE is on a divided or undivided road, one or more additional factors discussed with regard to block 705, e.g., congestion of traffic headed in the same/opposite direction of the UE, road conditions in an area associated with the GPS position of the UE, a history of collisions in the area, weather conditions in an area, may also affect selection of an appropriate value of the tunable parameter "a". For example, consider an undivided road scenario (e.g., such as illustrated in FIG. 5) and let the traffic congestion in the same direction be X, and congestion level in the opposite direction be Y. For such a case, in some configurations, a probability Ps(X,Y) of same direction collision and probability Po(X,Y) of opposite direction collision may be calculated. If X is low and Y is high, then it is possible that there are more passing attempts by vehicles in the opposite direction, which increases the probability of head-on collision. If passing is not allowed, the probability of opposite-direction Po(X,Y) collision may differ, but may be still higher than the same direction collision Ps(X,Y) due to the fact there are more vehicles traveling in the opposite direction in this particular case. The calculation of Ps(X,Y) and Po(X,Y) may take into account whether passing is allowed on this road. If Ps(X,Y)>Po(X,Y), a lower value of "a" (e.g., a=a1) may be used. If Ps(X,Y)<Po(X,Y), higher value of "a" (e.g., a=a2) may be used. Similarly, a history of collisions in the area may also be used to estimate the collision probability in the opposite direction or same direction, and thus select a proper value of parameter "a".

Weather conditions may also affect collision probabilities in one way over the other. For example, on a divided road, in rain and fog, rear ending collisions tend to increase. Thus in such cases, "a" may be adjusted to a low value. Road conditions, e.g., construction, road repair, existing traffic incident on the road, etc., may increase probabilities in one way over the other. For example, construction zones may increase same direction collisions due to rear endings, as cars tend to slow quickly in such zones. Therefore, again in such a case the parameter "a" should be tuned to a low value. Thus, as part of determining the frequency biasing adjustment $f_{ba}$, the tunable parameter "a" may be tuned based on the driving environment in order to achieve an appropriate biasing adjustment that can optimally compensate for the Doppler shift in the given driving environment.

Next, at 714, an adjusted carrier frequency $f_{ca}$ is determined based on the carrier frequency $f_c$ and the determined frequency biasing adjustment $f_{ba}$. For example, as discussed earlier with respect to FIGS. 5-6, the adjusted carrier frequency $f_{ca}$ for use in communicating the V2V messages may be determined based on $f_c+f_{ba}$, e.g., as $f_{ca}=f_c+f_{ba}$. For example, with reference to FIG. 5, the transmitting UE 504 may determine the carrier frequency adjustment (f1$_{ca}$) as f1$_{ca}$=f$_c$f1$_{ba}$ while the UE 502 may determine the carrier frequency adjustment (f2$_{ca}$) as f2$_{ca}$=fc+f2$_{ba}$.

At 716, the UE may communicate with a second UE based on the adjusted carrier frequency $f_{ca}$ that is adjusted based on the carrier frequency $f_c$ and the determined frequency biasing adjustment $f_{ba}$. In various configurations, communicating with a second UE based on the adjusted carrier frequency $f_{ca}$ may include at least one of transmitting a V2V message using the adjusted carrier frequency $f_{ca}$ receiving a V2V message using the adjusted carrier frequency $f_{ca}$. Thus in some configurations, the operation at 716 may include at least one of the operations illustrated with regard to 718 and 720. Accordingly, in some configurations, as part of communicating with a second UE based on the adjusted carrier frequency $f_{ca}$, at 718 the UE may transmit, e.g., a V2V message, based on the adjusted carrier frequency. For example, with reference to FIG. 5, after determining the carrier frequency adjustment f1$_{ca}$, the UE 504 may transmit the V2V message 506 based on the adjusted carrier frequency adjustment f1$_{ca}$ (where f1$_{ca}$=f$_c$+ f1$_{ba}$). Similarly, in some configurations, as part of communicating with a second UE based on the adjusted carrier frequency $f_{ca}$, at 720 the UE may receive, e.g., a V2V message, based on the adjusted carrier frequency. For example, after determining the carrier frequency adjustment f2$_{ca}$, the UE 502 may receive the V2V message 506 from the UE 504 based on the adjusted carrier frequency adjustment f2$_{ca}$ (where f2$_{ca}$=f$_c$+f2$_{ba}$). If both a transmitter and receiver in V2V communication apply respective frequency biasing adjustments (based on the respective speeds) and communicate based on the respective adjusted frequencies, the Doppler shift of the direct path may be fully compensated in some cases.

Figure 8:
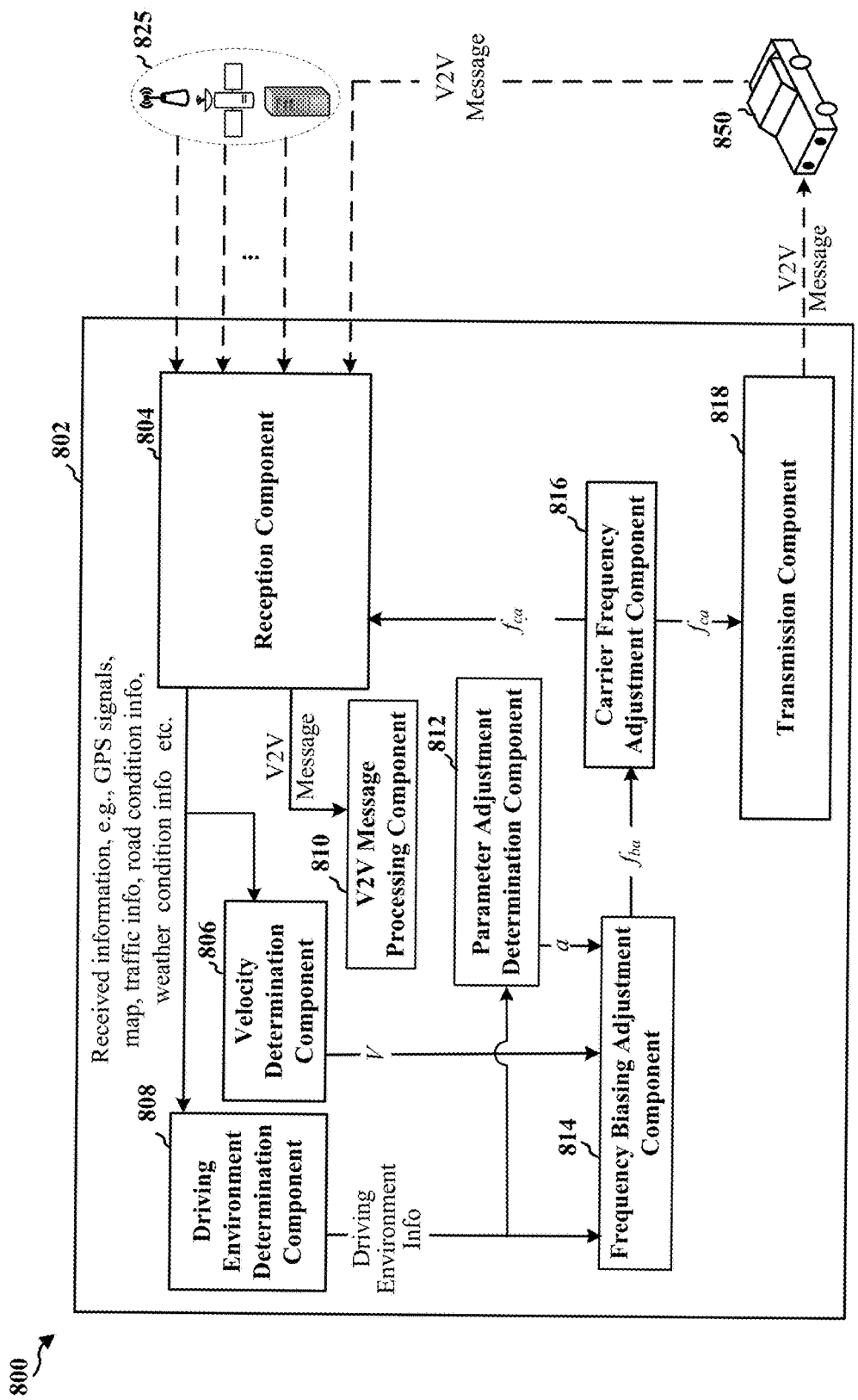
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a UE capable of supporting V2V communications, e.g., such as UE 104/350/502/504. The apparatus 802 may include a reception component 804, a velocity determination component 806, a driving environment determination component 808, a V2V message processing component 810, a tunable parameter adjustment determination component 812, a frequency biasing adjustment component 814, a carrier frequency adjustment component 816, and a transmission component 818.

The reception component 804 may be configured to receive and process messages (e.g., signals communicating information) from other devices such as one or more devices (e.g., network nodes, servers, satellites, etc.) collectively shown as devices 825, and/or from other V2V devices such as the UE 850. For example, the apparatus 802 may be the UE 502 of the system 500 and the reception component 804 may be configured to receive V2V messages from other UEs in the system. A V2V message received by the reception component 804 (e.g., from UE 850) may be provided to the V2V message processing component 810 for further processing in order to decode/recover the information communicated in the V2V message. The recovered V2V message information may be stored in a memory and/or provided to other components of the apparatus 802 for further use. The reception component 804 may be further configured to receive signals/information from other devices 825. Such signals/information may include, e.g., GPS signals, maps of an area, traffic condition reports/updates in an area, road condition information of an area, weather condition information of an area, collision history information corresponding to an area, etc. The area for which the information may be received may be an area associated with a GPS position of the apparatus 802. In some configurations, the reception component 804 may include a GPS receiver capable of receiving and processing GPS signals from a GPS source. The signals/information received by the reception component 804 may be processed and provided to one or more other components of the apparatus 802 for possible use in performing the operations discussed with respect to the blocks of flowchart 700.

The velocity determination component 806 may be configured to determine the speed/velocity of the apparatus 802. The speed/velocity may be determined by the UE based on measurements performed by a speed/velocity sensor and/or speedometer included in the velocity determination component 806. In some configurations, the velocity determination component 806 may determine the speed/velocity based on received GPS signals from a GPS source.

The driving environment determination component 808 may be configured to determine the driving environment of the apparatus. There may be a variety of possible driving environments in which the apparatus 802 may be traveling, e.g., divided road, undivided road, one way road, etc., and the apparatus 802 may be among other vehicles that may be moving in, e.g., the same direction as the apparatus 802 and/or moving in both the same and opposite direction as the apparatus. In some configurations, the driving environment of the UE may be determined based on a determined GPS location/position of the apparatus and a map associated with the area corresponding with the GPS position. In some configurations, the apparatus 802 may include a database of maps and may retrieve the map of the area associated with the current GPS position when needed to determine the driving environment. In some other configurations, the map of the area may be received from an external source, e.g., a network node, an external server, or satellite. For example, map corresponding to a current GPS position may be obtained from Google maps or a variety of other similar services/sources readily available. In some configurations, input from a variety of sources may be used in determining the driving environment of the UE. For example, such sources may include one or more sensors (e.g., a camera) of the apparatus 802, network based sources (e.g., location servers) and/or one or more different applications on the apparatus 802 that can obtain the information from one or more servers or satellites over a wireless communication network. For example, one such app may be a map/navigation application that can provide a map/map data of the area corresponding to a determined GPS location/position of the apparatus 802. Based on the GPS location/position and the map, the driving environment determination component 808 may determine the driving environment, e.g., whether the apparatus 802 is on a divided road, an undivided road, a one-way road, etc.

In some configurations, as part of determining the driving environment of the apparatus 802, the driving environment determination component 808 may be configured to determine at least one of whether a road on which the apparatus 802 is traveling is divided or undivided, a congestion of traffic headed in a same direction of the apparatus 802, a congestion of traffic headed in an opposite direction of the apparatus 802, a GPS position of the apparatus 802, a map of an area associated with the GPS position of the apparatus 802, road conditions in an area associated with the GPS position of the apparatus 802, weather conditions in an area associated with the GPS position of the apparatus 802, or a history of collisions in the area associated with the GPS position of the apparatus 802. As discussed in more detail with respect to FIGS. 5-7, in some configurations, one or more of such factors, e.g., traffic congestion, road conditions, weather conditions, collision history, etc., may be determined based on the determined GPS location/position of the apparatus 802, the map of the area associated with the determined GPS position, and based on input from a variety of sources such as sensors and/or external network nodes, servers, satellites, etc.

The parameter adjustment determination component 812 may be configured to determine an appropriate value for the tunable parameter "a" (used in equation (2) as previously discussed) based on the determined driving environment of the apparatus 802. For example, in some configurations, based on the determined driving environment, the parameter adjustment determination component 812 may be configured to determine whether it is more important/desirable to minimize the effect of Doppler shift in V2V communication between UEs traveling in the same direction or those traveling in the opposite direction, and tune/adjust the parameter "a" according to the determination. In the same manner as previously discussed in detail with respect to FIGS. 5-7, in addition to determining whether the apparatus 802 is on a divided/undivided road, various other factors (e.g., traffic congestion, road conditions, weather conditions, collision history, etc.) determined as part of determining the driving environment may be factored in by the determination component 812 to determine whether V2V communication performance between the apparatus 802 and UEs moving towards the apparatus 802 in the opposite direction should be favored or between the apparatus 802 and UEs moving in the same direction should be favored. Since such factors may affect the collision probability of vehicles moving in the same direction or opposite direction, the parameter adjustment determination component 812 may take into consideration one or more of the above factors to decide whether the apparatus 802 should favor V2V communication performance with the UEs moving in the opposite direction towards the apparatus 802 or with the UEs moving in the same direction, and select an appropriate value of the tunable parameter "a" in accordance with the determination. As part of determining an appropriate value of the tunable parameter "a", the parameter adjustment determination component 812 may be configured to determine the same direction and opposite direction collision probabilities based on the various factors as discussed previously with respect to FIGS. 5-7. While many examples have been discussed with respect to FIGS. 5-7 regarding tuning/adjustment (e.g., selection of a value for parameter "a" between 0 and 1) of the tunable parameter "a" under different driving environments, consider one simple divided road environment example where, for simplicity, the effect/contribution of one or more of the above mentioned factors (e.g., traffic/road/weather conditions) is ignored. In the example, the driving environment of the apparatus 802 is a divided road and there may be a greater probability of collisions between UEs traveling in the same direction. In such an example, the parameter adjustment determination component 812 may be configured to decide to favor V2V communication performance with UEs traveling in the same direction as the apparatus 802. Thus, the parameter adjustment determination component 812 may be configured to tune parameter "a" is tuned to "a1", where "a1" is a selected value of the parameter "a" on a lower end between 0 and 1, e.g., one of $\frac{1}{10}$, $\frac{1}{5}$, $\frac{1}{4}$, $\frac{1}{3}$, $\frac{1}{2}$, etc. In another simple undivided road example (ignoring other factors), there may be a greater probability of collisions between UEs traveling in the opposite direction. In such an example, the parameter adjustment determination component 812 may be configured to decide to favor V2V communication performance with UEs traveling in the opposite direction towards the apparatus 802. Thus, the parameter adjustment determination component 812 may be configured to tune parameter "a" is tuned to "a2", where "a2" is a selected value of the parameter "a" on a higher end, e.g., 1 or close to 1. The selected value of the tunable parameter may be provided as an input to the frequency biasing adjustment component 814. In some configurations, the parameter adjustment determination component 812 may be implemented as part of the frequency biasing adjustment component 814.

The frequency biasing adjustment component 814 may be configured to determine a frequency biasing adjustment $f_{ba}$ based at least on the determined velocity of the UE. For example, as discussed with respect to FIG. 5, in some configurations the frequency biasing adjustment $f_{ba}$ may be determined in accordance with equation (1) where the determination is based on the velocity of the UE, the carrier frequency $f_c$, and the speed of light c. In some other configurations, the driving environment of the UE may be considered in determining the frequency biasing adjustment $f_{ba}$, where the effect of the driving environment may be reflected by the value selected for the tunable parameter "a" provided by the parameter adjustment determination component 812. In such configurations, the frequency biasing adjustment component 814 may be configured to determine the frequency biasing adjustment $f_{ba}$ further based on the determined driving environment and use the tunable parameter "a" from the determination component 812. Thus in such configurations, the frequency biasing adjustment component 814 may be configured to determine the frequency biasing adjustment $f_{ba}$ in accordance with equation (2), i.e., $f_{ba}=-a*[V*f_c/C]$, where V may be the velocity of the apparatus 802, $f_c$ is the carrier frequency and c is the speed of light. In various configurations, the determined frequency biasing adjustment $f_{ba}$ may be provided to the carrier frequency adjustment component 816.

The carrier frequency adjustment component 816 may be configured to determine an adjusted carrier frequency $f_{ca}$ that is adjusted based on the carrier frequency $f_c$ and the determined frequency biasing adjustment $f_{ba}$. In various configurations, the carrier frequency adjustment component 816 may be configured to determine the adjusted carrier frequency $f_{ca}$ based on $f_c+f_{ba}$, e.g., with the adjusted carrier frequency $f_{ca}$ being calculated as: $f_{ca}=f_c+f_{ba}$. In various configurations, the adjusted carrier frequency $f_{ca}$ is then used to communicate with another UE as discussed earlier with respect to FIGS. 5-7. For example, in some configurations, the carrier frequency adjustment component 816 may be configured to control the reception component 804 to receive, e.g., a V2V message, based on the adjusted carrier frequency $f_{ca}$ that is adjusted based on the carrier frequency $f_c$ and the determined frequency biasing adjustment $f_{ba}$.

The transmission component 818 may be configured to transmit messages to one or more external devices. For example, the transmission component 818 may be configured to transmit V2V messages to one or more other UEs such as UE 850. In some configurations, the carrier frequency adjustment component 816 may be configured to control the transmission component 818 to transmit, e.g., a V2V message, based on the adjusted carrier frequency $f_{ca}$ that is adjusted based on the carrier frequency $f_c$ and the determined frequency biasing adjustment $f_{ba}$.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
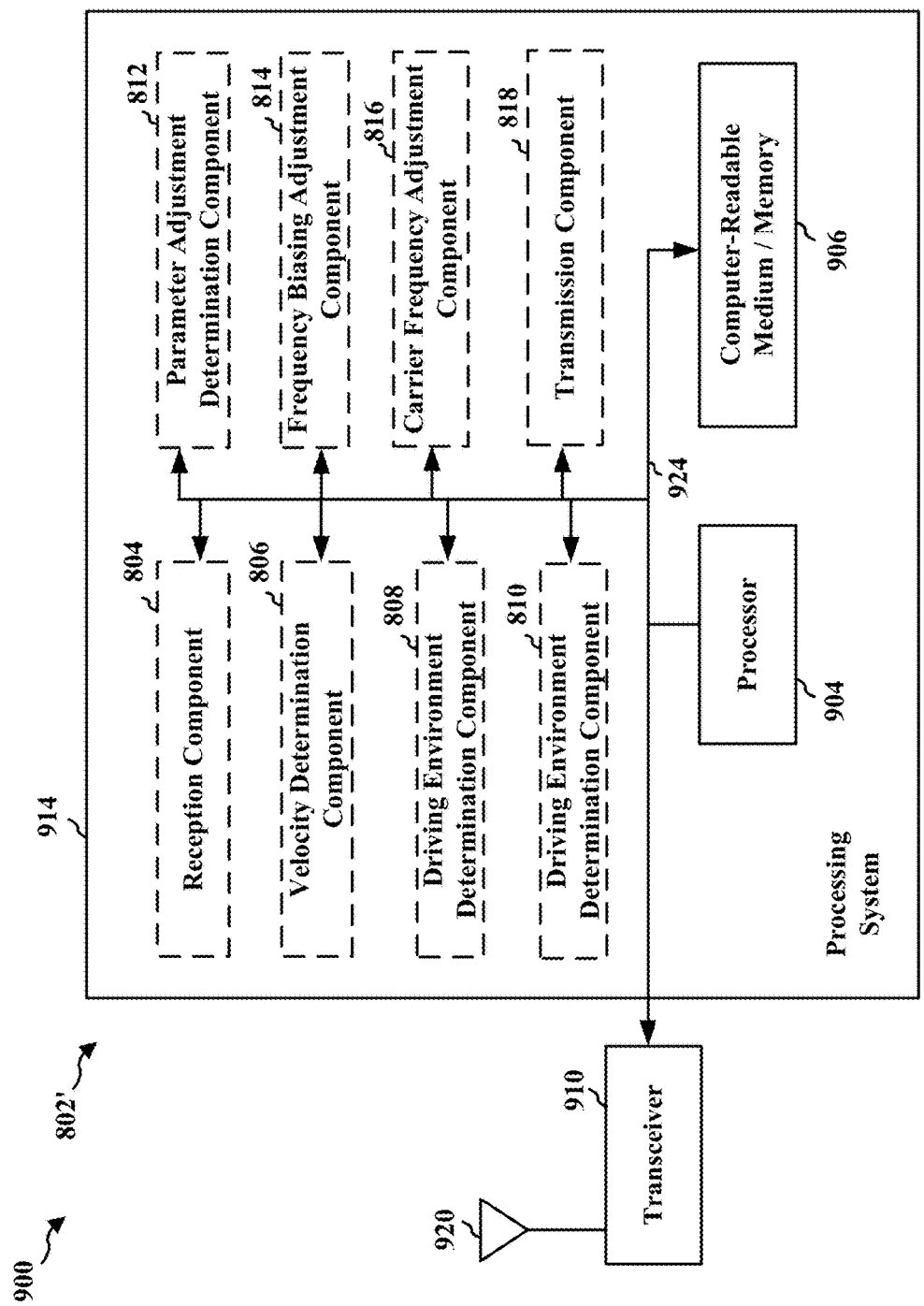
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, 816, 818 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 818, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, 816, 818. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for determining a velocity of the apparatus 802. The apparatus 802/802' may further include means for determining a frequency biasing adjustment $f_{ba}$ based on the determined velocity of the apparatus. The apparatus 802/802' may further include means for communicating with a UE based on an adjusted carrier frequency $f_{ca}$ that is adjusted based on a carrier frequency $f_c$ and the determined frequency biasing adjustment $f_{ba}$. In some configurations, the means for communicating is configured to transmit based on the adjusted carrier frequency $f_{ca}$ that is adjusted based on the carrier frequency $f_c$ and the determined frequency biasing adjustment $f_{ba}$. In some configurations, the means for communicating is configured to receive based on the adjusted carrier frequency $f_{ca}$ that is adjusted based on the carrier frequency $f_c$ and the determined frequency biasing adjustment $f_{ba}$. In some configurations, the apparatus 802/802' may further include means for determining the adjusted carrier frequency $f_{ca}$ based on $f_c+f_{ba}$. In some configurations, the frequency biasing adjustment $f_{ba}$ is determined based at least on a factor equal to v/c, where v is the determined velocity and c is the speed of light.

In some configurations, the frequency biasing adjustment $f_{ba}$ is determined based on $-a*(v/c)*f_c$, where a is a tunable parameter and $0 \le a \le 1$. In some configurations, the apparatus 802/802' may further include means for determining a driving environment of the apparatus 802/802', and means for adjusting the tunable parameter a based on the determined driving environment of the apparatus. In some configurations, the means for determining the driving environment of the apparatus is configured to determine at least one of whether a road on which the apparatus is traveling is divided or undivided, a congestion of traffic headed in a same direction of the apparatus, a congestion of traffic headed in an opposite direction of the apparatus, a GPS position of the apparatus, a map of an area associated with the GPS position of the apparatus, road conditions in the area associated with the GPS position of the apparatus, a history of collisions in the area associated with the GPS position of the apparatus, whether the UE is traveling on a road with an opposing traffic passing lane, or weather conditions in the area associated with the GPS position of the apparatus. In some configurations, the means for determining the frequency biasing adjustment is further configured to determine the frequency biasing adjustment based on the determined driving environment. In some such configurations, the frequency biasing adjustment is determined further based at least on the tunable parameter a.

In some configurations, the means for adjusting the tunable parameter a is configured to tune a to $a_1$ upon determining that the road on which the apparatus is traveling is divided, and tune a to $a_2$, where $a_2 > a_1$, upon determining that the road on which the apparatus is traveling is undivided.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In one configuration, an exemplary apparatus, e.g., apparatus 802/802', comprises: a memory (e.g., memory 906) and at least one processor (e.g., processor 904) coupled to the memory. The at least one processor may be configured to: determine a velocity of the apparatus, determine a frequency biasing adjustment based on the determined velocity of the apparatus, and communicate with a UE based on an adjusted carrier frequency that is adjusted based on a carrier frequency and the determined frequency biasing adjustment.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of vehicle-to-vehicle (V2V) communication of a user equipment (UE), comprising:
    determining a velocity of the UE;
    determining a frequency biasing adjustment based on the determined velocity of the UE and a tunable parameter separate from the determined velocity of the UE, wherein the tunable parameter is based on a driving environment of the UE; and
    communicating with a second UE based on an adjusted carrier frequency that is adjusted based on a carrier frequency and the determined frequency biasing adjustment.

2. The method of claim 1, wherein the communicating comprises transmitting based on the adjusted carrier frequency that is adjusted based on the carrier frequency and the determined frequency biasing adjustment.

3. The method of claim 1, wherein the communicating comprises receiving based on the adjusted carrier frequency that is adjusted based on the carrier frequency and the determined frequency biasing adjustment.

4. The method of claim 1, wherein the adjusted carrier frequency is $f_{ca}$ and the adjusted carrier frequency $f_{ca}$ is determined based on $f_c+f_{ba}$, where $f_c$ is the carrier frequency and $f_{ba}$ is the frequency biasing adjustment.

5. The method of claim 4, wherein the frequency biasing adjustment $f_{ba}$ is determined based at least on a factor equal to v/c, where v is the determined velocity and c is the speed of light.

6. The method of claim 5, wherein the frequency biasing adjustment $f_{ba}$ is determined based on $-a*(v/c)*f_c$, where a is the tunable parameter and $0 \leq a \leq 1$.

7. The method of claim 6, further comprising:
    determining the driving environment of the UE; and
    adjusting the tunable parameter a based on the determined driving environment of the UE.

8. The method of claim 1, further comprising determining the driving environment of the UE, wherein the frequency biasing adjustment is further determined based on the determined driving environment.

9. The method of claim 8, wherein the determining the driving environment of the UE comprises determining at least one of whether a road on which the UE is traveling is divided or undivided, a congestion of traffic headed in a same direction of the UE, a congestion of traffic headed in an opposite direction of the UE, a Global Positioning System (GPS) position of the UE, a map of an area associated with the GPS position of the UE, road conditions in the area associated with the GPS position of the UE, a history of collisions in the area associated with the GPS position of the UE, whether the UE is traveling on a road with an opposing traffic passing lane, or weather conditions in the area associated with the GPS position of the UE.

10. The method of claim 9, wherein the frequency biasing adjustment is determined further based at least on the tunable parameter a, where $0 \leq a \leq 1$, the method further comprising:
    tuning a to a first value $a_1$ upon determining that the road on which the UE is traveling is divided; and
    tuning a to a second value $a_2$, where $a_2 > a_1$, upon determining that the road on which the UE is traveling is undivided.

11. An apparatus for wireless communication, comprising:
    means for determining a velocity of the apparatus;
    means for determining a frequency biasing adjustment based on the determined velocity of the apparatus and a tunable parameter separate from the determined velocity of the apparatus, wherein the tunable parameter is based on a driving environment of the apparatus; and
    means for communicating with a user equipment (UE) based on an adjusted carrier frequency that is adjusted based on a carrier frequency and the determined frequency biasing adjustment.

12. The apparatus of claim 11, wherein the means for communicating is configured to transmit based on the adjusted carrier frequency that is adjusted based on the carrier frequency and the determined frequency biasing adjustment.

13. The apparatus of claim 11, wherein the means for communicating is configured to receive based on the adjusted carrier frequency that is adjusted based on the carrier frequency and the determined frequency biasing adjustment.

14. The apparatus of claim 11, wherein the adjusted carrier frequency is $f_{ca}$, the apparatus further comprising:
    means for determining the adjusted carrier frequency $f_{ca}$ based on $f_c+f_{ba}$, where $f_c$ is the carrier frequency and $f_{ba}$ is the frequency biasing adjustment.

15. The apparatus of claim 14, wherein the frequency biasing adjustment $f_{ba}$ is determined based at least on a factor equal to v/c, where v is the determined velocity and c is the speed of light.

16. The apparatus of claim 15, wherein the frequency biasing adjustment $f_{ba}$ is determined based on $-a*(v/c)*f_c$, where a is the tunable parameter and $0 \leq a \leq 1$.

17. The apparatus of claim 16, further comprising:
means for determining the driving environment of the apparatus; and
means for adjusting the tunable parameter a based on the determined driving environment of the apparatus.

18. The apparatus of claim 11, further comprising means for determining the driving environment of the apparatus, wherein the means for determining the frequency biasing adjustment is further configured to determine the frequency biasing adjustment based on the determined driving environment.

19. The apparatus of claim 18, wherein the means for determining the driving environment of the apparatus is configured to determine at least one of whether a road on which the apparatus is traveling is divided or undivided, a congestion of traffic headed in a same direction of the apparatus, a congestion of traffic headed in an opposite direction of the apparatus, a Global Positioning System (GPS) position of the apparatus, a map of an area associated with the GPS position of the apparatus, road conditions in the area associated with the GPS position of the apparatus, a history of collisions in the area associated with the GPS position of the apparatus, whether the UE is traveling on a road with an opposing traffic passing lane, or weather conditions in the area associated with the GPS position of the apparatus.

20. The apparatus of claim 19, wherein the frequency biasing adjustment is determined further based at least on the tunable parameter a, where $0 \leq a \leq 1$, the apparatus further comprising:
means for adjusting the tunable parameter a, the means for adjusting the tunable parameter being configured to tune a to a first value $a_1$ upon determining that the road on which the apparatus is traveling is divided, and tune a to a second value $a_2$, where $a_2 > a_1$, upon determining that the road on which the apparatus is traveling is undivided.

21. An apparatus for wireless communication, comprising:
a memory; and
at least one processor coupled to the memory and configured to:
determine a velocity of the apparatus;
determine a frequency biasing adjustment based on the determined velocity of the apparatus and a tunable parameter separate from the determined velocity of the apparatus, wherein the tunable parameter is based on a driving environment of the apparatus; and
communicate with a user equipment (UE) based on an adjusted carrier frequency that is adjusted based on a carrier frequency and the determined frequency biasing adjustment.

22. The apparatus of claim 21, wherein the at least one processor is configured, as part of being configured to communicate, to transmit based on the adjusted carrier frequency that is adjusted based on the carrier frequency and the determined frequency biasing adjustment.

23. The apparatus of claim 21, wherein the at least one processor is configured, as part of being configured to communicate, to receive based on the adjusted carrier frequency that is adjusted based on the carrier frequency and the determined frequency biasing adjustment.

24. The apparatus of claim 21, wherein the adjusted carrier frequency is $f_{ca}$, and
wherein the at least one processor is further configured to determine the adjusted carrier frequency $f_{ca}$ based on $f_c + f_{ba}$, where $f_c$ is the carrier frequency and $f_{ba}$ is the frequency biasing adjustment.

25. The apparatus of claim 24, wherein the at least one processor is configured to determine the frequency biasing adjustment $f_{ba}$ based at least on a factor equal to v/c, where v is the determined velocity and c is the speed of light.

26. The apparatus of claim 25, wherein the at least one processor is configured to determine the frequency biasing adjustment $f_{ba}$ based on $-a*(v/c)*f_c$, where a is the tunable parameter and $0 \leq a \leq 1$.

27. The apparatus of claim 26, wherein the at least one processor is further configured to:
determine the driving environment of the apparatus; and
adjust the tunable parameter a based on the determined driving environment of the apparatus.

28. The apparatus of claim 21, wherein the at least one processor is further configured to determine the driving environment of the apparatus, and determine the frequency biasing adjustment further based on the determined driving environment.

29. The apparatus of claim 28, wherein the at least one processor is further configured, as part of being configured to determine the driving environment of the apparatus, to determine at least one of whether a road on which the apparatus is traveling is divided or undivided, a congestion of traffic headed in a same direction of the apparatus, a congestion of traffic headed in an opposite direction of the apparatus, a Global Positioning System (GPS) position of the apparatus, a map of an area associated with the GPS position of the apparatus, road conditions in the area associated with the GPS position of the apparatus, a history of collisions in the area associated with the GPS position of the apparatus, whether the UE is traveling on a road with an opposing traffic passing lane, or weather conditions in the area associated with the GPS position of the apparatus.

30. A non-transitory computer-readable medium of an apparatus, the computer-readable medium storing computer executable code, comprising code to:
determine a velocity of the apparatus;
determine a frequency biasing adjustment based on the determined velocity of the apparatus and a tunable parameter separate from the determined velocity of the apparatus, wherein the tunable parameter is based on a driving environment of the apparatus; and
communicate with a user equipment (UE) based on an adjusted carrier frequency that is adjusted based on a carrier frequency and the determined frequency biasing adjustment.

* * * * *